March 24, 1936.   G. P. KINGSBURY   2,035,078
SLUG CASTING MACHINE
Filed Aug. 14, 1935   10 Sheets-Sheet 5

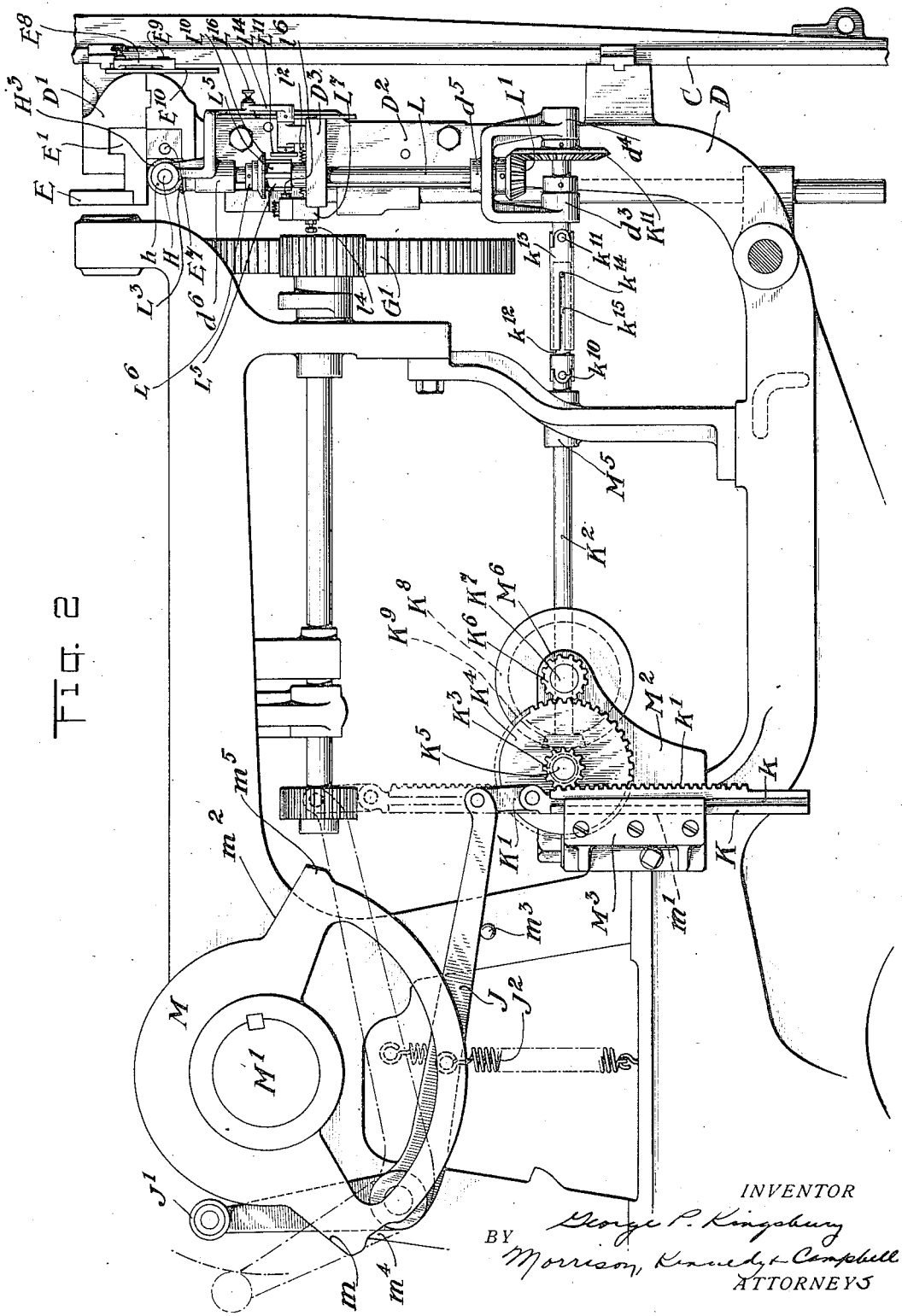

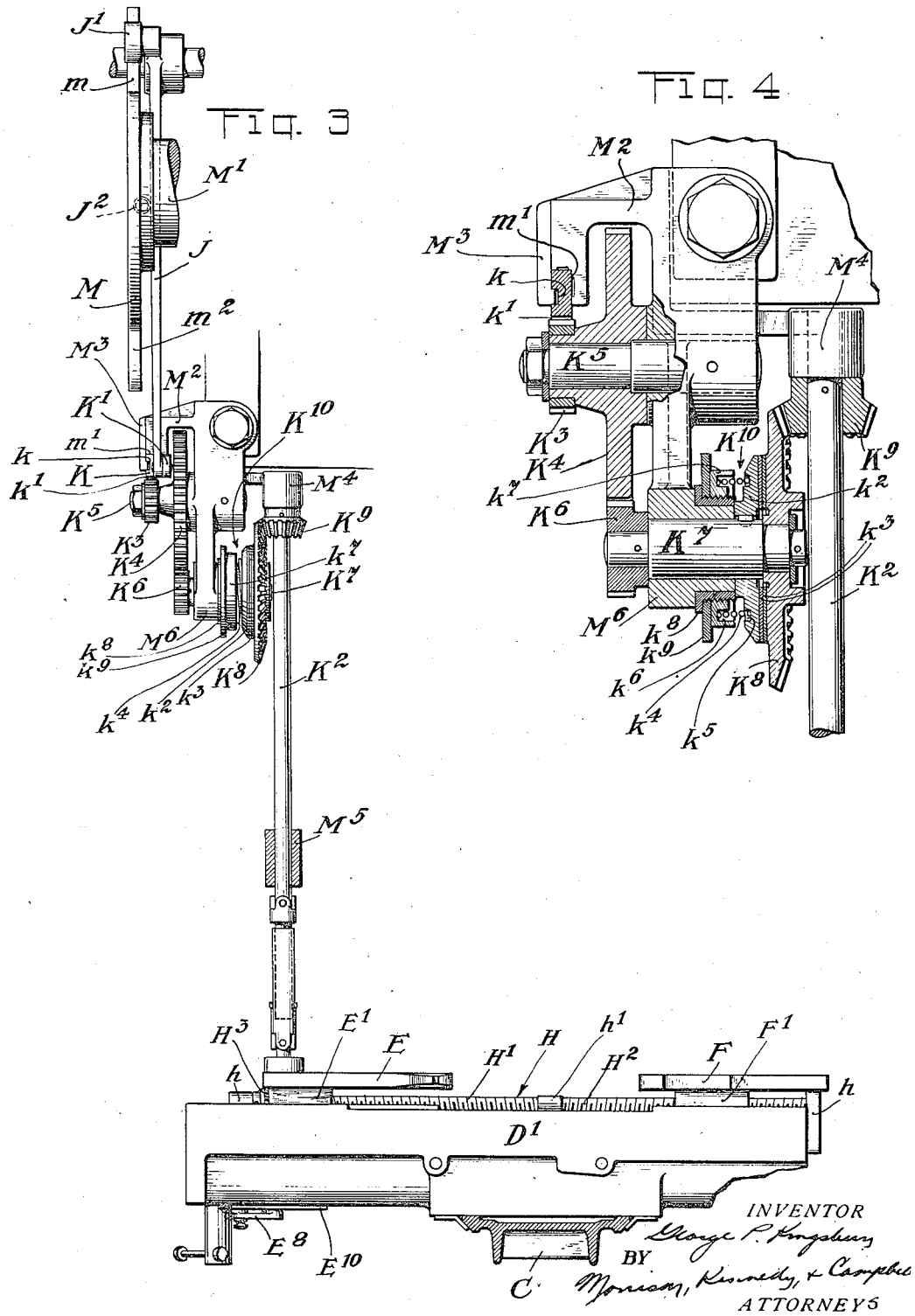

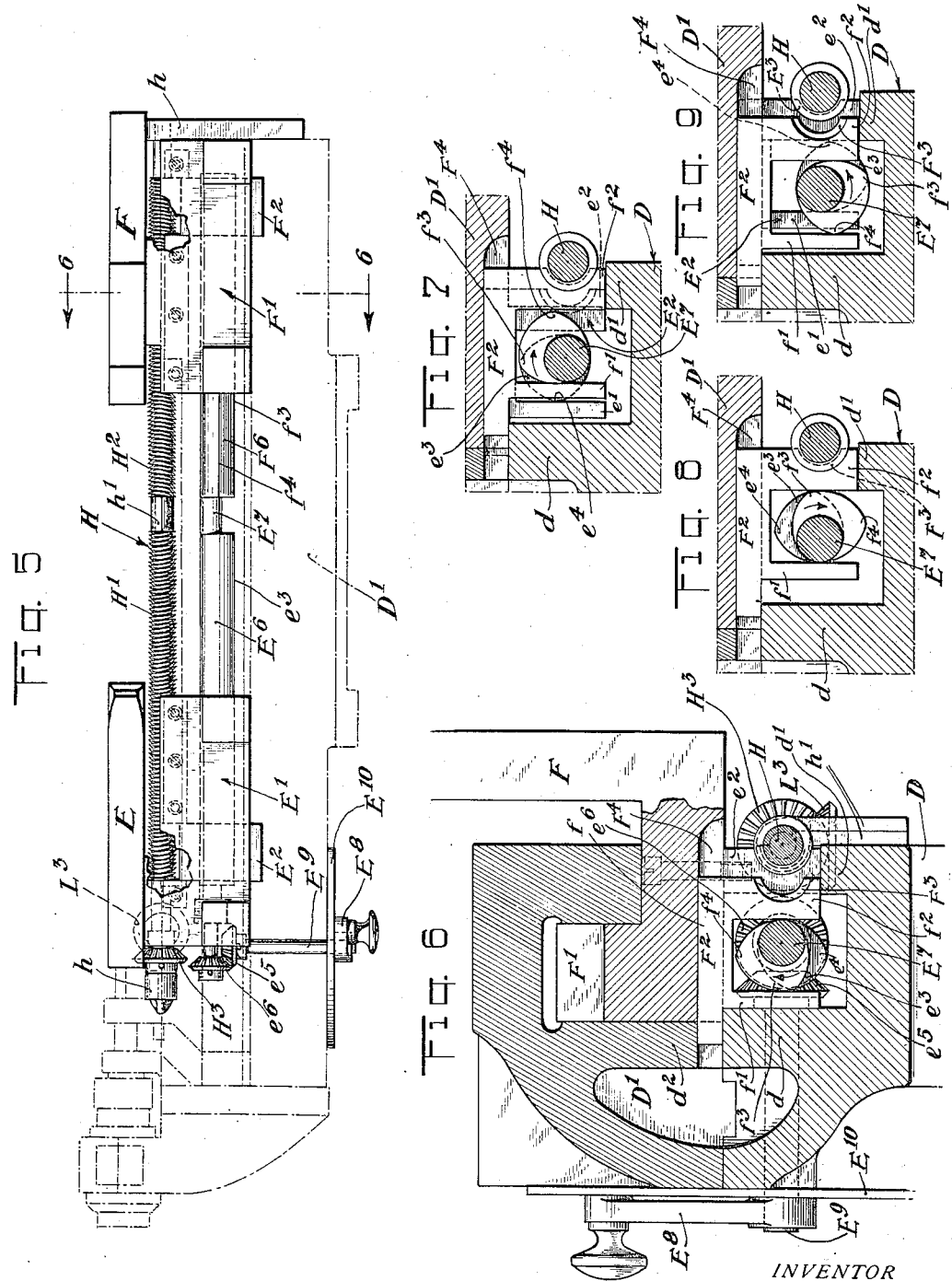

INVENTOR
George P. Kingsbury
BY Morrison, Kennedy & Campbell
ATTORNEYS

March 24, 1936.  G. P. KINGSBURY  2,035,078
SLUG CASTING MACHINE
Filed Aug. 14, 1935   10 Sheets-Sheet 6
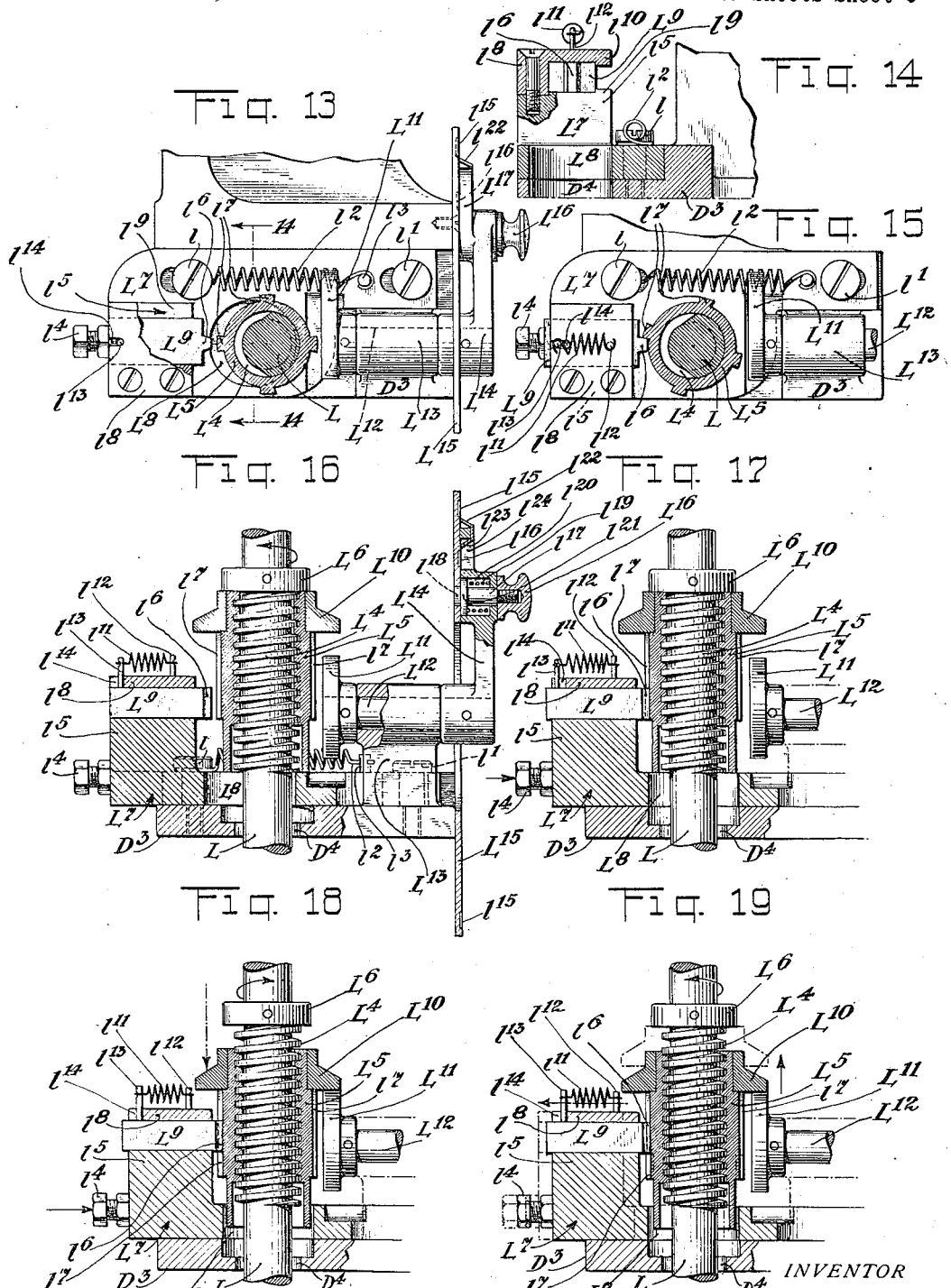

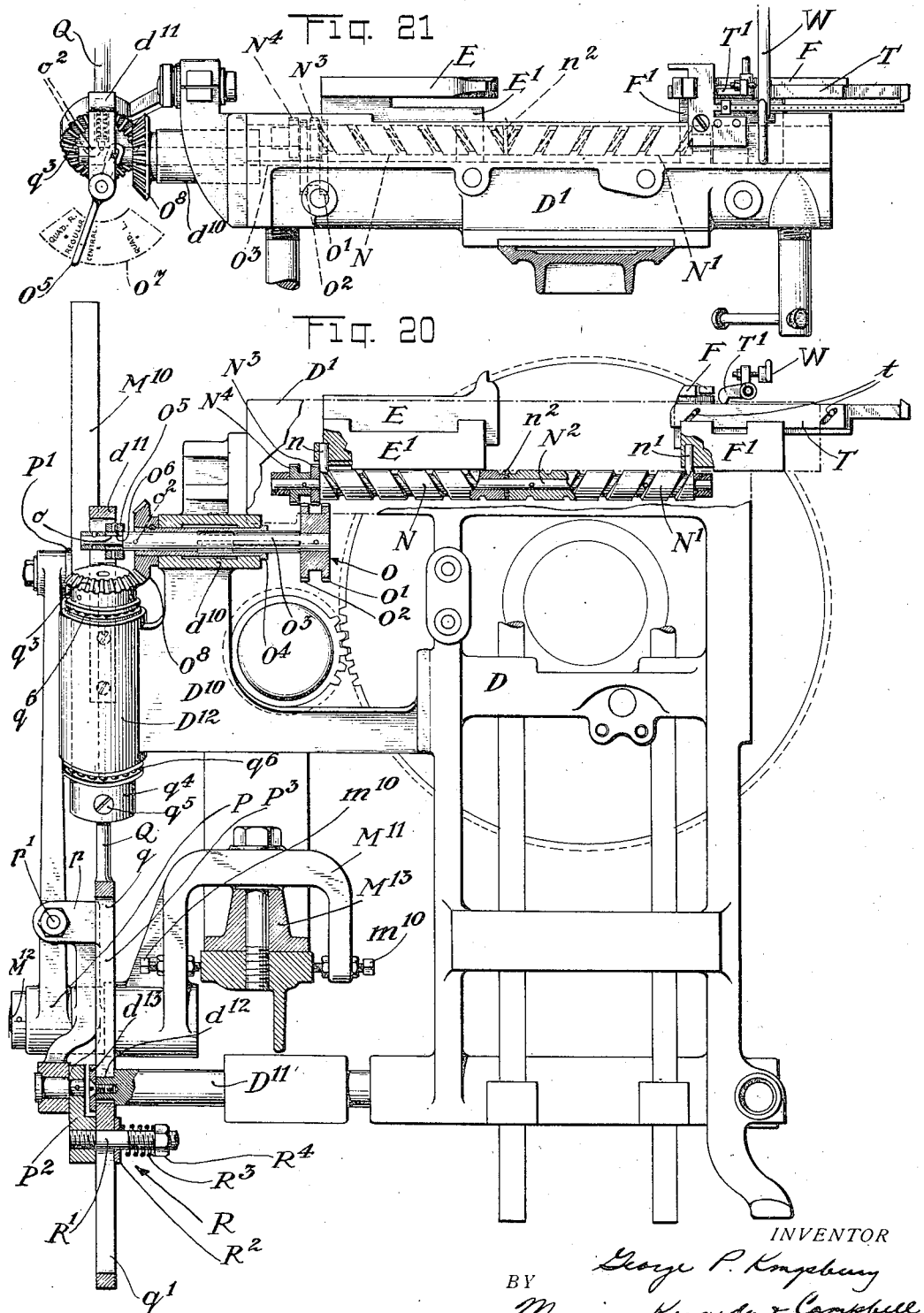

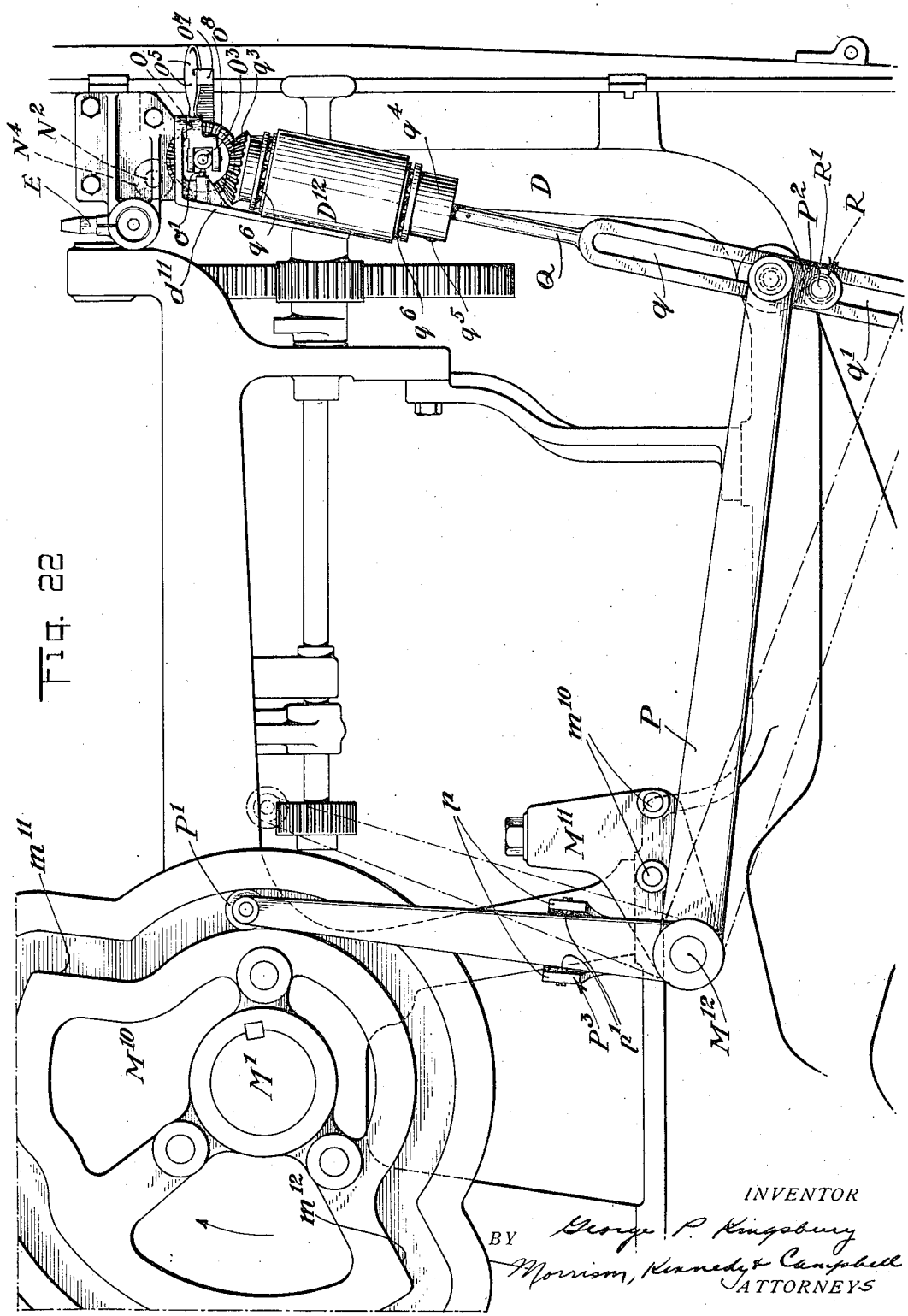

March 24, 1936.  G. P. KINGSBURY  2,035,078
SLUG CASTING MACHINE
Filed Aug. 14, 1935  10 Sheets-Sheet 9
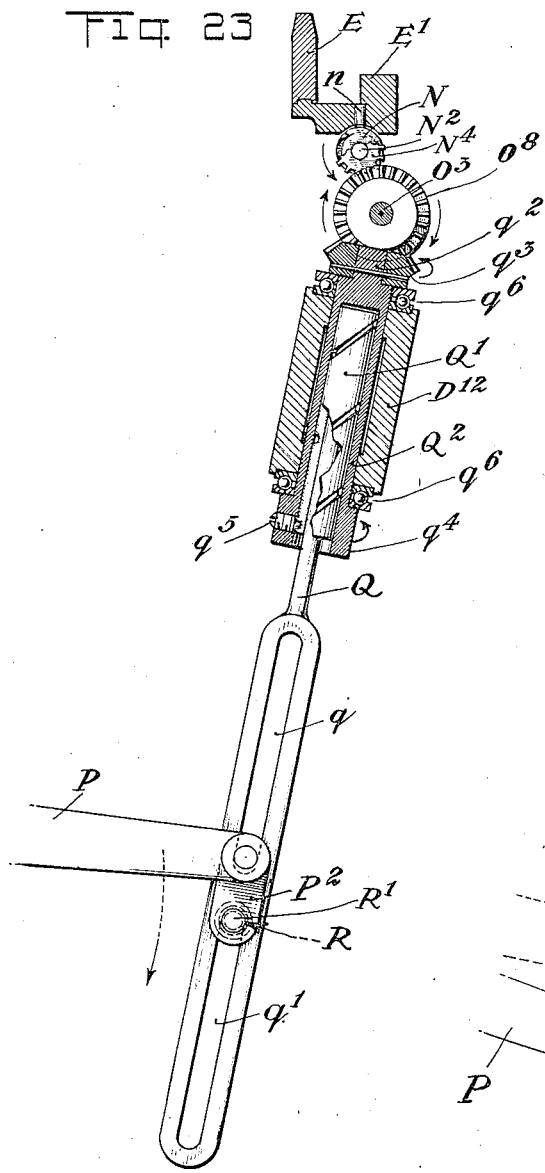
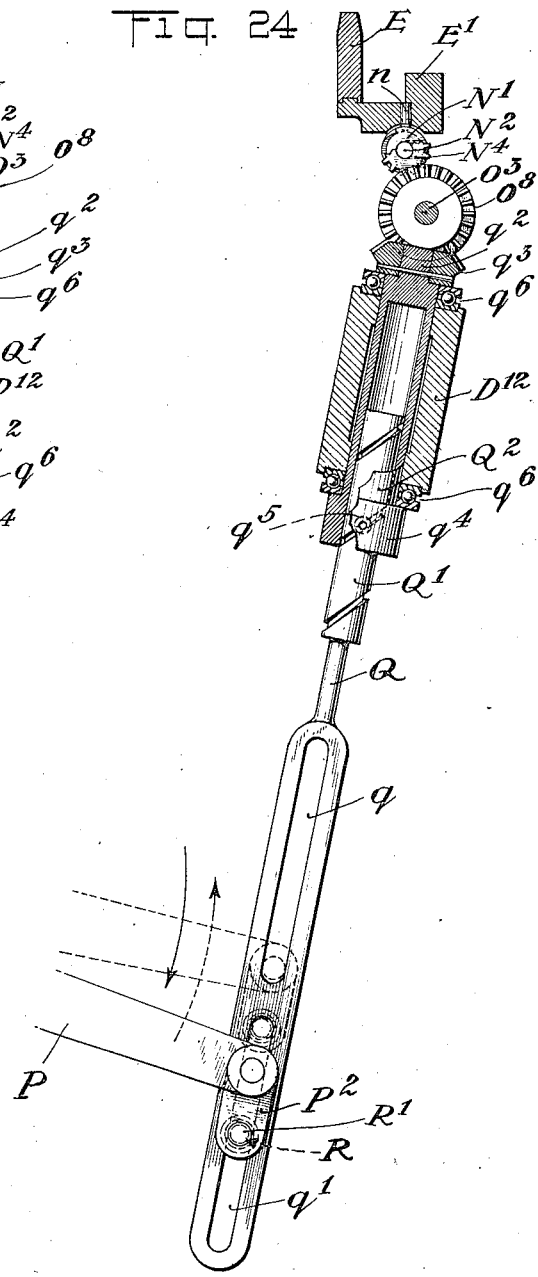
INVENTOR
George P. Kingsbury
BY Morrison, Kennedy & Campbell
ATTORNEYS

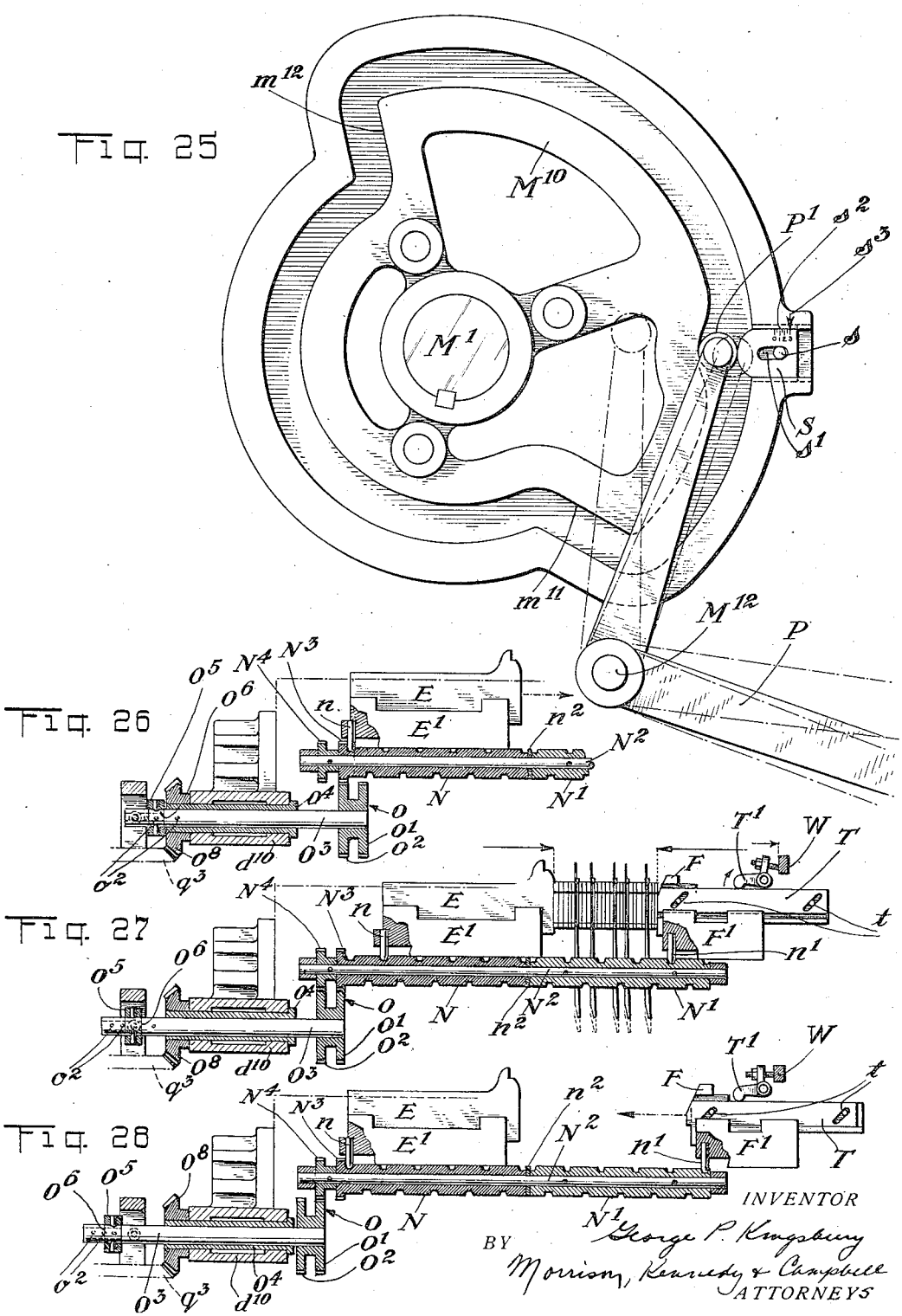

Patented Mar. 24, 1936

2,035,078

UNITED STATES PATENT OFFICE 2,035,078

SLUG CASTING MACHINE

George P. Kingsbury, Hollis, N. Y., assignor to Mergenthaler Linotype Company, a corporation of New York Application August 14, 1935, Serial No. 36,054

29 Claims. (Cl. 199—50)

This invention relates to slug casting machines, such as linotype machines of the general organization represented in U. S. Letters Patent to O. Mergenthaler, No. 436,532, wherein circulating matrices and expansible spacebands are composed in line by the manipulation of a keyboard, the composed line transferred to a slotted mold for the casting of a type bar or slug, and the matrices and spacebands thereafter separated and returned by a distributing mechanism to the magazines from which they started.

In these machines, when the composed line is presented to the mold, it is positioned between a pair of clamping jaws which have been previously set to receive it and, while so positioned, the line is justified by the expansion of the spacebands which are driven up through the line by a so-called justification bar operated prior to the casting operation. Ordinarily, the right hand jaw is relatively fixed (having only a limited movement to operate the customary pump stop), whereas the left hand jaw is adjustable to different positions to accord with the length of the mold slot or with the length of the composed line in its justified condition. In casting under such conditions (which are the most common conditions), it is obvious that the number of matrices and spacebands composed must be sufficient to fill out the line completely (except, of course, for the limited space allowed for justification), and hence when it is desired to cast slugs with blank spaces for the ends for indenting or centering, it is necessary to employ blanks or quads for that purpose, involving considerable annoyance and delay.

The general object of this invention is to adapt the machine not only to cast lines of full length as ordinarily, but in addition lines of less than full length, regardless of their actual length, so that the latter lines may be composed without blanks or quads and merely with the matrices necessary for the printed matter. While various schemes of this sort have heretofore been proposed, the present invention offers many improvements upon prior arrangements in the way of greater simplicity, better efficiency and more extended scope of operation.

According to the invention, the movable supports for the two line clamping jaws (the latter being made long enough to perform their required functions of closing the mold slot at the front) are actuated by two screw sections (a right-hand threaded section for one jaw and a left-hand threaded section for the other jaw) rotatable through intermediate connections from the main shaft of the machine. When both jaw supports are connected to their respective screw sections, they are, prior to casting, through the rotation of the screw sections in one direction, moved equidistantly toward each other until arrested by contact of their respective jaws with the opposite ends of the composed line (for "centering") and later, after casting, restored to their original positions of maximum separation through the rotation of the screw sections in the opposite direction. When either jaw support is alone connected to its respective screw section, it will, in like manner, be moved independently of the other jaw support (the latter remaining fixed) for quadding at the right or at the left as may be desired, depending of course upon the jaw selected. When both jaw supports are disconnected from the screw sections, the machine is free to function in the usual way, the right hand jaw being left normally stationary and the left hand jaw being adjustable by the customary devices. Due provision is made for selectively connecting either or both jaws with their respective screw sections or for leaving both jaws disconnected as desired.

The right hand jaw is made rigid with its movable support, whereas the left hand jaw is made adjustable with respect to its movable support, this adjustment permitting the two jaws to be spaced apart initially to correspond to the length of the mold slot, whether that be selected for a long measure or a short measure. The same adjustment would of course be useful in other ways, as for example in what might be termed offset centering or unequal indenting at opposite ends of the slug, that is to say, centering with respect to an imaginary line located to one side of the actual transverse center line of the slug.

When the clamping jaws are moved into contact with the composed line, rotation of the screw sections is arrested and, because of the low pitch of the screw thread, the line clamping jaws will be locked against separation firmly to hold the line between them. It might be stated here that, in the connections between the screw sections and the main shaft of the machine, there is included a friction clutch which through the slippage of the parts will permit those portions of the intermediate connections which operate positively from the main shaft of the machine to complete their normal cycle of operation after rotation of the screw sections has been arrested by contact of the jaws with the composed line.

When casting from lines with spacebands, in order to permit the expansion of such lines (whether used in quadding or centering), the jaws are moved outwardly for a limited distance (in the present instance a variable distance of from zero to 3 ems) from their line contacting positions and then held in their outwardly moved positions, as the line is spread out by the expansion of the spacebands when driven upwardly through the line by the customary justifying devices. This is accomplished by providing for a limited reverse rotation of the screw sections sufficient to separate the jaws the desired amount. The amount of this reverse rotation is controlled by manually settable mechanism which therefore determines the extent of the line spread during justification. In the embodiments illustrated, the extent of the line spread may be varied from zero (as in the case of very short lines or lines without spacebands) to 3 ems (as in the case of lines of maximum length), it being understood that this reduction in the line spread for shorter lines is to compensate for the lesser number of spacebands which are included in such lines and are therefore incapable of producing the same amount of spread as would the greater number of spacebands which are included in longer or full length lines.

As above intimated, the right hand jaw in casting lines of full length is normally arranged to engage and operate a pump stop lever which permits casting to take place when the lines are properly composed, but since the right hand jaw in the present instance is movable from its normal position for quadding or centering out of contact with the pump stop lever, provision is made for operating the latter under these conditions. The mechanism for accomplishing this is fully described in the patent to Frank C. Frolander No. 1,971,400, and is not shown in detail in this application. As set forth in the patent referred to, the left hand jaw is provided with a yieldable section which is caused to yield by the clamping of the composed line between the two jaws when the right hand jaw is moved to the proper quadding or centering position, and this section, in yielding actuates a train of connections which operates the ordinary pump stop lever to permit casting. The train of connections referred to includes an interponent from which the movement of the yieldable section is imparted to the pump stop lever and this interponent is rendered active or inactive as the right hand jaw is or is not positioned for quadding or centering. When the left hand jaw is used only for quadding, the right hand jaw is then left in its normal position and is utilized to operate the pump stop lever as the left hand jaw in moving to quadding position clamps the composed line between the two jaws. The operating connections for the pump stop lever, therefore, thus not only provide for the quadding and centering operations for the two line clamping jaws, but moreover are of such character that the casting operation can not take place during the quadding or centering unless the composed line is clamped tightly between the jaws.

In casting from lines with spacebands, it has already been explained that the jaws during the justification of the line are moved back from their line contacting positions, leaving a space which must be filled up by the expansion of the line. In order to insure that the jaws clamp the line firmly, say in the event the spacebands fail to fill up the space between the jaws, provision is made for rotating the screw sections for a limited distance in their initial direction after justification or until the jaws are again arrested by contact with the ends of the composed line.

The features of the invention above alluded to, as well as others, will be fully set forth in the detailed description to follow.

Referring to the drawings:

Fig. 2 is an end elevation of the parts shown in Fig. 1, looking from the left in that figure;

Fig. 3 is a plan view of the parts shown in Fig. 2;

Fig. 4 is an enlarged sectional view of a portion of the mechanism shown in Fig. 3 and revealing the details of the clutch mechanism;

Fig. 5 is a plan view of the line clamping jaws and jaw supports with the vise cap removed and showing certain details of the screw section operating mechanism;

Fig. 6 is a vertical section on line 6—6 of Fig. 5, with the vise cap however in place and revealing details of the mechanism for selectively engaging either or both line clamping jaws with the screw sections;

Figs. 7, 8 and 9 are views similar to Fig. 6, but of a portion only of the mechanism shown therein, and illustrating the jaw selecting devices in different positions of adjustment;

Fig. 13 is a plan view of the mechanism for spreading the jaws a limited distance prior to justification when a line with spacebands has been sent into the machine, the parts being shown in normal position;

Fig. 14 is a vertical section taken on line 14—14 of Fig. 13;

Fig. 15 is a view similar to Fig. 13 but with the parts shown in active position;

Fig. 16 is a vertical sectional view of the mechanism shown in Fig. 13, and with the parts in normal position;

Fig. 17 is a sectional view of a portion of the mechanism shown in Fig. 16, but with the parts in the position they will occupy just prior to the reverse rotation of the screw sections for effecting the setting of the jaws to permit line spread;

Fig. 18 is a view similar to Fig. 17, but showing the parts after the jaws have been set to permit line spread;

Fig. 19 is a view similar to Fig. 17, showing the parts about to be restored so as to permit the jaws to be returned to their positions of maximum separation;

Fig. 20 is a front elevation of a portion of a linotype machine equipped with another embodiment of the present invention;

Fig. 21 is a plan view of the parts shown in Fig. 20;

Fig. 22 is an end elevation of the parts shown in Fig. 1, looking from the left in that figure;

Figs. 23 and 24 are views, partly in section, showing details of the screw section operating mechanism in different positions of adjustment;

Fig. 25 is a view of the cam on the main cam shaft for operating the improved mechanism; and Figs. 26, 27 and 28 are views showing the line clamping jaws and the screw section operating device with the parts set respectively for a quadding left, a centering and a quadding right operation.

The matrices and the expansible spacebands are composed in line in an assembler A (Fig. 1) under the restraining influence of a line resistant (not shown) which can be set for lines of different length, all in the usual way. After the line has been composed, the assembler is raised to position the line between the fingers of the line delivery carriage B, which thereupon moves to the left (and in doing so inaugurates the operation of the machine) and transfers the composed line through the intermediate channel $B^1$ into the vertically movable transporter or first elevator C slidably mounted in the vise frame D. Upon receiving the line, the first elevator immediately descends to position it between the left hand jaw E and the right hand jaw F and in front of a slotted mold G mounted on the mold disc $G^1$ which previously has been rotated through a quarter turn in a counterclockwise direction to bring the mold G to horizontal casting position. When the line has been presented in front of the mold G, the latter then moves forward from the rear into contact with the line and the two clamping jaws for the slug casting operation, the line, prior to casting, being alined and justified in the usual way when the machine is being operated under the usual conditions. After the slug has been cast, the mold is carried from its horizontal casting position to a vertical ejecting position (see Fig. 1) by a three-quarter rotation of the mold disc $G^1$, the first elevator in the meantime being raised to deliver the composed line to the matrix and spaceband distributing devices and finally coming to rest in its original or line receiving position.

As so far described, the parts and their operation, except as hereinafter noted, are or may be the same as embodied in the commercial linotype machines, or as set forth in the Mergenthaler patent No. 436,532 before referred to.

Figure 10:
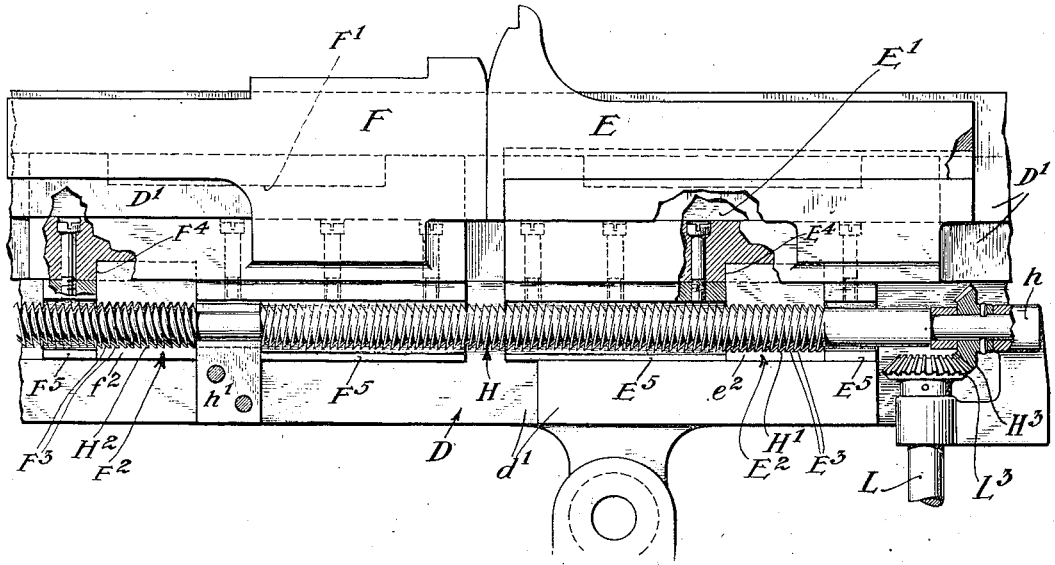
Fig. 10 is a rear elevational view of the line clamping jaws and the screw section operating mechanism, and showing the right hand jaw in the position it would assume after a quadding right operation and in the event no line were presented between the jaws.
Figure 11:
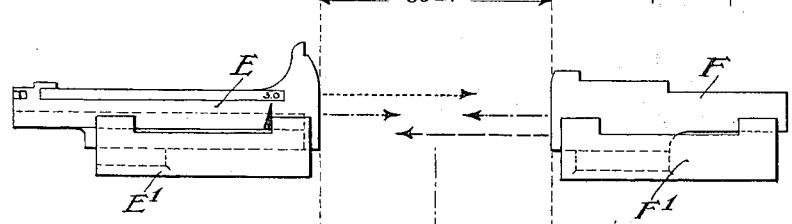
Fig. 11 is a diagrammatic view of the line clamping jaws and jaw supports, and showing by different arrows the travel of the jaws during a quadding left, a quadding right and a centering operation for a line say of 10 ems in length and with the jaws initially set for a maximum separation of 30 ems.

As before stated, the present invention provides devices, whereby the line clamping jaws may be operated automatically to cooperate with lines of less than full length so as to cast slugs with blank spaces at either end as for "quadding" or at both ends, as for "centering", and these automatic devices will now be described in detail. But, first, it should be stated perhaps that each of the jaws E and F is made long enough when used alone for quadding, to close that part of the mold slot left exposed by a short composed line, or in the absence of a composed line, to close the mold slot completely (see Fig. 10). Except as thus far modified and as hereinafter noted, the two jaws are substantially the same as those employed in the commercial machines and they are mounted for movement in the vise frame D in the customary manner, being carried by supporting blocks $E^1$ and $F^1$ slidable in suitable guideways formed in the vise frame D (see, for example, Figs. 5 and 6).

In the first embodiment illustrated in Figs. 1 to 19, the two jaws E and F are movable toward and from each other by a periodically operated part in the form of a rotatable screw member H horizontally arranged near the top and at the rear of the vise frame D and supported by two end bearings $h$ and one center bearing $h^1$ secured to said frame (Figs. 5 and 6). The screw member (see Fig. 5) extends substantially the full length of the vise cap $D^1$ and is formed in its left portion with a left-hand screw section $H^1$ and in its right portion with a right-hand screw section $H^2$ and is adapted to be connected to the respective jaws through the medium of two blocks $E^2$ and $F^2$ (for the left and right hand jaws, respectively). The connecting blocks (see Figs. 6 to 9) are similar in that both are formed with top portions $e$ and $f$, front portions $e^1$ and $f^1$ and rear portions $e^2$ and $f^2$ depending from said top portions, and further are cut with half thread sections $E^3$ and $F^3$ in the outer faces of the rear depending portions. The blocks $E^2$ and $F^2$ differ, however, in that the thread cut in the block $E^2$ is a left-hand thread to cooperate with the thread in the left screw section $H^1$, whereas that cut in the block $F^2$ is a right-hand thread to cooperate with the thread in the right screw section $H^2$.

In order that the blocks $E^2$ and $F^2$ may be selectively engaged with the screw member H to effect the centering and the different quadding operations and indeed also to permit the machine to function in the normal way, they are arranged for a limited fore-and-aft movement. When in their forward positions (which is determined by the banking of the front faces of the blocks against the intermediate longitudinal rib $d$ in the upper portion of the vise frame), the blocks stand clear of the screw sections, whereas when in their rearmost positions the blocks engage the screw sections and accordingly are actuated thereby. The blocks $E^2$, $F^2$ are supported throughout this fore-and-aft movement (as well as throughout their longitudinal movement along the top of the vise frame when actuated by the screw sections as will hereinafter appear), at the back, by the rear longitudinal rib $d^1$ formed at the top of the vise frame D and which is cut away for the purpose, and at the front by extensions of the top portions $e$ and $f$ of the blocks resting on the intermediate rib $d$ of the vise frame before alluded to. The top portions of the blocks extend into recesses $E^4$, $F^4$ formed in the bottoms of the line clamping jaw sections $E^1$, $F^1$, said recesses being of sufficient length to accommodate the fore-and-aft movement of the blocks and of a width to permit a sliding fit between the parts, this arrangement permitting the line clamping jaws to partake of the same longitudinal movement as the blocks $E^2$, $F^2$. The intermediate rib $d^2$ of the vise cap is cut away at the bottom to provide clearance for the block extensions, and in order to give the line clamping jaws the necessary support where the rear rib $d^1$ of the vise frame is cut away, there is provided for each jaw a pair of filler blocks $E^5$ and $F^5$ screwed thereto at the bottom, one on each side of its respective block $E^2$ or $F^2$, and resting on said rib member $d^1$. The blocks $E^5$, $F^5$ are cut away in their rear faces to clear the screw sections $H^1$, $H^2$.

According to the arrangement just described, when the screw member H is rotated in a clockwise direction, it will move the two jaws E and F equi-distantly toward each other (assuming both to be connected thereto through their respective blocks $E^2$ and $F^2$) until they contact with the opposite ends of a composed line which has previously been positioned between them and, when the screw member H is rotated in the opposite direction, it will in like manner move the jaws equi-distantly away from each other to return them to their original positions of maximum separation. If one jaw only is connected to the screw member, it will in like manner, as the screw member is rotated in one direction, be moved toward the opposed jaw (which will remain stationary) until arrested by contact with the composed line as the latter banks against the stationary jaw and will be restored to its position of maximum separation as before by the rotation of the screw member in the opposite direction. When neither jaw is connected with the screw member, the machine is conditioned for normal operation and will operate in the usual way. Since the composed lines positioned between the jaws may vary in length, the actual extent of rotation of the screw member H will of course vary accordingly, and hence, provision is made for such varied rotation of the member in its actuating connections, as will presently appear.

As previously stated, the connection and the disconnection of the jaws E and F with and from the screw member H is effected through the fore-and-aft movement of the blocks $E^2$ and $F^2$ into and out of engagement with said member. This movement is effected in the present instance (see Fig. 5) by the manual adjustment of a pair of cams $E^6$ and $F^6$ (one for each block $E^2$ and $F^2$) formed on a long cam shaft $E^7$ rotatably mounted at its opposite ends in bearings formed in the vise frame and positioned between the depending vertical portions $e^1$ and $e^2$ and $f^1$ and $f^2$ of the blocks $E^2$ and $F^2$. The cams $E^6$ and $F^6$ are adapted to actuate the blocks $E^2$ and $F^2$ into and out of engagement with their respective screw sections $H^1$, $H^2$, and for this purpose are provided each with two high portions, one high portion ($e^3$ and $f^3$) in the same relative position, and the other high portion ($e^4$ and $f^4$) spaced therefrom at an angle of approximately 90°, but in opposite directions. In other words, the second high portions ($e^4$ and $f^4$) of the different cams are actually, as far as angular spacing is concerned, 180° apart (Figs. 6 to 9). With this arrangement, it is apparent that when the corresponding high portions ($e^3$ and $f^3$) of the two cams (i. e. those which have the same relative positions) are turned toward the front of the machine (Fig. 6), the blocks $E^2$ and $F^2$ will be cammed forwardly out of engagement with the screw member H and for this adjustment, the machine is conditioned for normal operation. When the same high portions are turned toward the rear of the machine (Fig. 8), the blocks $E^2$ and $F^2$ will be cammed rearwardly into engagement with the screw member H, and as both jaws will now be connected with said member, the machine will be conditioned for a centering operation. When the cams are turned so that the second high portion $e^4$ on the cam $E^6$ associated with the block $E^2$ is turned forwardly the opposed high portion $f^4$ on the cam $F^6$ associated with the block $F^2$ will be turned rearwardly and the block $E^2$ will be cammed out of engagement with the screw member H, whereas the block $F^2$ will be cammed into engagement with said member (Fig. 7). For this adjustment of the cams, the machine will be conditioned for quadding right. And finally when the cams are turned through 180° from the position shown in Fig. 7 to that shown in Fig. 9, the block $F^2$ will be cammed forwardly out of engagement with the screw member, whereas the block $E^2$ will be cammed into engagement therewith, and for this adjustment of the cams the machine will be conditioned for quadding left.

Figure 1:
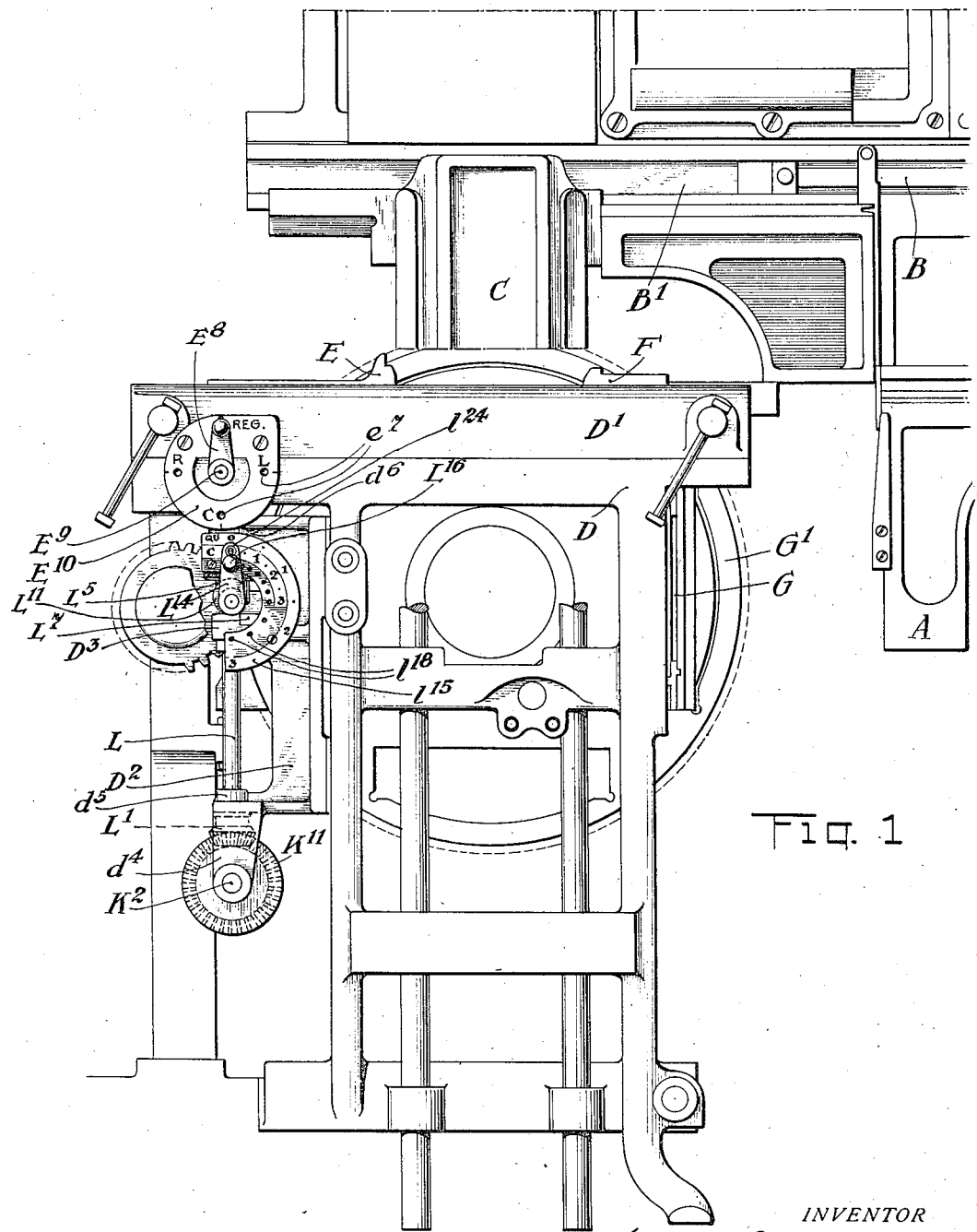
Fig. 1 is a front elevation of a portion of a linotype machine equipped with the present improvements.

The cams $E^6$ and $F^6$ are manually adjusted to their different positions, and for this purpose, there is provided at the front of the machine (Figs. 1 and 5) a handle $E^8$ pinned at the front end of a shaft $E^9$ extending through the vise frame and which, at its rear end, has fixed thereto a bevel gear $e^5$ meshing with a corresponding bevel gear $e^6$ fixed to the cam shaft $E^7$. Associated with the handle is a plate $E^{10}$ screwed to the vise cap, and marked, at intervals of 90° with the indicia "Reg.", "L", "C", and "R", indicating the respective settings of the handle wherein the cams will be adjusted for regular machine operation, left hand quadding, centering, and right hand quadding. In the plate $E^{10}$, there are provided small recesses $e^7$ at the different positions of adjustment for cooperating with a spring detent (not shown) in the handle $E^8$, to maintain the setting of the parts once the adjustment has been made (Fig. 1).

It might be stated at this point that the cams $E^6$, $F^6$ are coextensive in length with the screw sections $H^1$, $H^2$ so that they will maintain the setting of the blocks $E^2$, $F^2$ throughout their full travel (Fig. 5).

The rotation of the screw sections $H^1$, $H^2$ to effect the movement of the jaws against the composed line and away from the composed line to their positions of maximum separation, is brought about by a cam M keyed on the main shaft $M^1$ of the machine through mechanism which will now be described (Figs. 2 to 4).

After a composed line has been presented in front of the mold, a rise $m$ in the cam M will engage a follower $J^1$, mounted at the end of the rear arm of a bell crank lever J pivotally mounted on the machine frame at the rear, to rock said lever against the tension of a spring $J^2$, which latter is secured at one end to the front arm of the lever J and anchored at its other end to the base frame of the machine. As the lever J is rocked by the cam M from its normal position, it will effect the upward movement of a vertically sliding member K which at its upper end is connected at the forward extremity of the front arm of the lever J through the medium of a link $K^1$. The vertically sliding member K rides in a recess $m^1$ formed in a bracket $M^2$ mounted on the machine frame and is provided in the outer face thereof with a longitudinal groove $k$ into which there extends the lip of a retaining plate $M^3$ screwed to the bracket for constraining the vertically sliding member K in its movement (Fig. 4). After the casting operation, a drop $m^2$ in the cam M permits the lever J to return to normal position under the influence of the spring $J^2$ and thereby effect the downward movement of the vertically sliding member K to its original position.

This reciprocable movement of the vertically sliding member is transmitted through a train of multiplying gears to a rotatable shaft $K^2$ journalled at its rear end in a bearing $M^4$ carried by the bracket $M^2$, midway of its ends in a bearing $M^5$ carried by the main frame, and at its front end in a pair of spaced bearings $d^3$ and $d^4$ provided in the U-shaped portion of a bracket $D^2$ secured at the left of the vise frame D (Figs. 2 and 4).

The train of multiplying gears just referred to (see Fig. 4) includes a small pinion $K^3$ meshing with a rack $k^1$ provided in the front edge of the vertically sliding member K and secured on the hub of a larger gear $K^4$ rotatably mounted on a stub shaft $K^5$ pinned in the bracket $M^2$. The large gear $K^4$ in turn meshes with a pinion $K^6$ fixed at one end to a stub shaft $K^7$ rotatably mounted in an extension $M^6$ of the bracket $M^2$ and which, at its opposite end, carries a bevelled gear $K^8$ meshing with a corresponding bevelled gear $K^9$ pinned to the shaft $K^2$ at the rear end of the latter.

The bevelled gear $K^8$ is freely mounted on the stub shaft $K^7$, but is adapted to be rotated thereby through a friction clutch $K^{10}$ which includes, in part, a plate $k^2$ keyed to the shaft $K^7$ and a pair of intermediate fraction discs $k^3$ arranged between the plate and the adjacent face of the bevelled gear $K^8$. The clutch further includes a spring $k^4$ pressing the plate $k^2$ firmly against the friction discs and seated at one end in an annular groove $k^5$ formed in said plate and at its other end in a corresponding groove $k^6$ formed in an annular member $k^7$ threaded to a sleeve rotatably mounted on a reduced portion of the part $M^6$ that carries the stub shaft $K^7$. The pressure exerted by the plate $k^2$ on the friction members may thus be regulated by adjusting the position of the grooved member $k^7$ along the sleeve $k^8$ and, in order to maintain the adjustment, a circular lock nut $k^9$ is provided likewise threaded on the sleeve $k^8$ and adapted to be screwed against said member.

The shaft $K^2$ at its front end is provided with a bevelled gear $K^{11}$ meshing with a corresponding bevelled gear $L^1$ pinned to the lower end of a vertical shaft L which is rotatably mounted at its opposite ends in bearings $d^5$, $d^6$ formed in the bracket $D^2$ secured to the vise frame. The shaft L at its upper end (see Fig. 10) has also secured thereto, a bevelled gear $L^3$ meshing with a similar bevelled gear $H^3$ pinned to the screw member H and at the left end thereof.

According to the foregoing arrangement, as the vertically slidable member K is moved upwardly, it will through the intermediate connections just described, rotate the screw member H in a direction to move the jaws E and F equidistantly toward each other, should both be connected thereto, or one jaw toward the other should one only be connected to the screw member; whereas, when the vertically slidable member is actuated downwardly, it will, through the same connections, rotate the screw member in the opposite direction to move the jaws to their positions of maximum separation. Of course, if neither jaw is connected to the screw member H, the rotation of the latter will have no effect, and the machine will operate in its normal way.

The extent of movement of the vertically slidable member K is such as to rotate the screw member H an amount sufficient to cause either jaw (assuming the other to be stationary and no intermediate line between them) completely to close the mold slot, but, as will be understood, the rotation of the screw member H is arrested in most instances prior to the completion of its full rotation by contact of the jaws with the ends of a composed line, and this is the reason for the friction clutch $K^{10}$ previously described. Thus, the upward movement of the vertically slidable member K is transmitted through the friction clutch until the rotation of the screw member H is arrested, whereupon said clutch will slip, permitting said member to complete its full cycle of movement, since, as will be recalled, it is positively driven from the actuating cam M; and similarly, when the vertically slidable member starts downwardly, separation of the jaws will start immediately and will continue until they are arrested in their positions of maximum separation, thereby preventing further rotation of the screw member, whereupon the vertically slidable member will continue in its descent to normal position, likewise through the slipping of the clutch. The normal position of said member K is determined by a pin $m^3$ projecting from the main frame and against which the front arm of the lever J banks at its lower edge (see Fig. 2).

At this point, it might be stated that in order to permit the vise frame D to be swung forwardly without breaking the screw operating connections, there is provided in the horizontal shaft $K^2$ (Figs. 2 and 3) a pair of universal joints $k^{10}$ and $k^{11}$ connected by a pair of telescopic members $k^{12}$ and $k^{13}$, the inner one of which is provided with a transverse pin $k^{14}$ extending into longitudinal slots $k^{15}$ formed in the outer member, the arrangement permitting transmission of torque between the parts when the machine is in operation.

When the jaws in their movement toward each other are arrested by contact with the composed line, they are locked against separation by the screw sections $H^1$ and $H^2$ that actuate them, the pitch of the threads being low enough for this purpose. However, when the composed line includes spacebands, it is desirable that the jaws be moved outwardly for a limited distance in order to provide for expansion of the spacebands during the justification of the line. It is also desirable that this amount of jaw separation to permit justification be variable, since obviously, the number of spacebands ordinarily in a line would be proportional to the length of the line. In the present instance, the extent of this jaw separation may be varied from zero to 3 ems, it being understood that in the case of a line of maximum length (30 ems in the present machine), the amount of line spread, due to the expansion of the spacebands ordinarily composed in a line of this length, is approximately 3 ems.

In the present embodiment, this limited separation of the jaws is brought about by a reverse rotation of the screw member H just prior to the justification of the line, and the extent of such separation is controlled in a manner which will hereinafter be described. The reverse rotation of the screw member H is effected through the provision (see Fig. 2) of a recess $m^4$ in the cam M which arrives opposite the follower $J^1$ on the bell crank lever J just prior to the justification of the line and, as the follower enters the recess, the vertically slidable member K is actuated downwardly for a limited distance. This limited downward movement will result in rotating the screw member H in a direction reverse to its initial rotation and will cause a backing off from the composed line of the jaw or jaws which happen to be connected to the screw member H at the time. While the follower $J^1$ is in the cam recess, justification of the line takes place and, after this operation is completed, the cam follower again rides up on the high portion of the cam. If the line has been justified properly to fill out the space between the jaws, this latter movement of the follower $J^1$ will have no effect as far as rotating the screw member H is concerned, the friction clutch $K^{10}$ merely slipping as before when the line clamping jaws are arrested by contact with the line. However, in the event that the line has not been properly justified so as completely to fill the space between the jaws, this last movement of the follower $J^1$ to the high portion of the cam will result in rotating the screw member H in its initial direction until the jaws again are arrested by contact with the line, thus allowing the casting operation to proceed.

The mechanism for controlling the extent of jaw separation to permit justifying a quadded or centered line composed with spacebands is illustrated in Figs. 1, 2 and 13 to 19. This mechanism is mounted on a shelf $D^3$ jutting laterally from the bracket $D^2$ on the vise frame just beneath the controls for conditioning the machine for the different quadding, centering and normal operations. As shown in Fig. 16, the vertical shaft L for operating the screw member H extends through a hole $D^4$ in the shelf, and immediately thereabove it is threaded as at $L^4$ for a portion of its length. On this threaded portion $L^4$, there is provided a screw sleeve $L^5$ which, in its normal position, banks against an overlying collar $L^6$ pinned to said shaft. Normally the sleeve $L^5$ is held in this position of adjustment by a flat slide member $L^7$ engaging beneath the sleeve and which is arranged to slide in a fore-and-aft direction on the top of the shelf $D^3$, the member $L^7$ being connected to the shelf by a pair of screw and slot connections $l$ and $l^1$ which limit the extent of movement thereof (see Figs. 13 and 15). Normally the slide $L^7$ is in its rearmost position, wherein it is held by a spring $l^2$ anchored at one end to the screw which forms part of the rearmost pin and slot connection $l$ and at its forward end to a pin $l^3$ projecting upwardly from the slide.

As is well known, in the operation of machines of this character the mold slide moves forwardly prior to justification to bring the mold into contact with the composed line and, when this occurs, the mold slide engages a set screw $l^4$ threaded into the rearmost end of the slide $L^7$ and shifts the latter forwardly to bring a hole $L^8$ formed therein in registry with the sleeve $L^5$ and likewise in registry with the hole $D^4$ in the shelf, both the holes just referred to being of sufficient size to permit the sleeve to enter without binding. As the slide $L^7$ is moved forwardly, a spring pressed detent $L^9$, carried in a raised lug $l^5$ formed on said slide at the rear and which is equipped with a vertical rib $l^6$, engages the sleeve $L^5$ which in its outer cylindrical face is formed with a series of vertical ribs $l^7$ of a height equivalent to that of the rib on the detent. Now when the vertical shaft L starts the reverse rotation mentioned before, the sleeve $L^5$ (which ordinarily rotates with the shaft) will turn slightly until arrested by the banking of one of the ribs $l^7$ thereon against the rib $l^6$ on the detent. When this occurs, the continued rotation of the vertical shaft will cause the sleeve to thread downwardly along the shaft until arrested by the banking of an annular shoulder $L^{10}$ formed near the upper end of the sleeve against a cam $L^{11}$, whereupon the sleeve is arrested in its downward movement (Fig. 18). As the sleeve now can neither rotate with the shaft nor move along it, further rotation of the vertical shaft L is prevented, and the jaw or jaws which happen to be connected with the screw member H at the time are arrested in their movement away from the line. Thereafter, justification of the line follows and if the spacebands have been expanded sufficiently to fill out the space between the jaws, the sleeve $L^5$ will remain in its arrested position until after the line has been lifted from between the jaws by the first elevator subsequent to the casting operation, whereupon a projection $m^5$ formed on the cam M on the main cam shaft (see Fig. 2) will arrive opposite the follower $J^1$ on the bell crank lever, causing the latter to swing and rotate the vertical shaft L for a limited amount in its initial direction. The sleeve $L^5$ turns slightly with the shaft until again arrested by the banking of a rib $l^7$ thereon against the rib $l^6$ on the detent and, as the shaft L continues to rotate, said sleeve will thread upwardly until it banks against the collar $L^6$ on the shaft, in which position of course, the sleeve $L^5$ clears the fore-and-aft slidable member $L^7$, permitting the latter to move rearwardly to its normal position under the influence of the spring $l^2$ and disengage the detent $L^9$ from the sleeve (see Fig. 19).

Of course, if the expansion of the spacebands did not result in complete justification of the line, the sleeve $L^5$ would be moved upwardly for a limited distance, and indeed perhaps for its full distance if no spacebands were in the line, immediately after the justifying operation or when the follower $J^1$ (Fig. 2) rides out of the recess $m^4$ in the cam as previously described. This would have no effect upon the operation of the machine, however, as the function of the sleeve ceases immediately the jaws have been spaced the amount required for justifying the line.

The construction of the detent $L^9$ for holding the sleeve $L^5$ against rotation is shown in Figs. 13 and 14, and consists merely of a member rectangular in cross section, slidably arranged in a recess formed by the top surface of the lug $l^5$ on the sliding member $L^7$ and the two inner faces of an L-shaped cap member $l^8$ screwed to said lug. The lug and the cap member are also formed with opposed spaced shoulders $l^9$ and $l^{10}$ for retaining the detent in the recess, and the detent in the forward position of the slide $L^7$, is held yieldingly against the sleeve by a spring $l^{11}$ anchored at one end to a pin $l^{12}$ fixed in the upper face of the cap member, and at the other end to a pin $l^{13}$ projecting from the detent through a slot $l^{14}$ cut in the rear edge of said cap member.

The amount of jaw spread to permit justification of the composed line may be varied from zero to 3 ems in order to provide for lines of different length, as previously noted. This variation in spread is controlled by the edge cam $L^{11}$ that arrests the sleeve $L^5$ in its downward movement and, when the highest portion of said cam is turned to engage the shoulder $L^{10}$ on the sleeve, no downward movement of the latter will be permitted. Consequently, for this setting, the jaws will remain stationary in the positions in which they are arrested by contact with the composed line during a quadding or centering operation. On the other hand, when the edge cam $L^{11}$ is adjusted to a position wherein its lowest portion is effective to engage the shoulder on the sleeve, full downward travel of the latter is permitted, which is sufficient to permit a jaw which happens to be connected to the screw member to be backed off the line a distance equal to 3 ems. By adjusting the cam to different intermediate positions, the amount of jaw separation may be varied accordingly.

The edge cam $L^{11}$ is pinned at one end of a short shaft $L^{12}$ rotatably mounted in a bearing formed in a lug $L^{13}$ projecting upwardly from the shelf $D^3$ that supports the slide $L^7$ (the latter being cut away at one corner to clear said lug) and is turned to its different positions of adjustment by a handle $L^{14}$ cooperating with a dial plate $L^{15}$ secured at the front of the machine.

As shown in Figs. 1 and 16, the dial is equipped with two scales $l^{15}$ and $l^{16}$, each graduated in the half ems, the outer scale $l^{15}$ for use in a quadding operation and the inner scale $l^{16}$ for use in a centering operation, the scales being so indicated by the marks "QU" and "C" respectively. It will be observed that the graduations on the dial for centering are half the value of the graduations on the dial for quadding and the reason for this is apparent, since when the machine is conditioned for centering, both jaws are connected to the screw sections $H^1$ and $H^2$ and, if a total line spread of say 3 ems is desired, it is necessary only to back each jaw away from the line 1½ ems to obtain the line spread desired, whereas in a quadding operation, since one jaw is held stationary, in order to obtain a 3 em line spread, it is necessary to back the jaw which has been moved in contact with the composed line away from said line the full distance.

The crank handle $L^{14}$ is held in its different positions of adjustment by a pin $l^{17}$ arranged to enter holes $l^{18}$ provided in the dial plate $L^{15}$ and spaced corresponding to the different settings, and is held therein by a spring $l^{19}$ encircling the pin and housed in a circular recess $l^{20}$ formed in the handle $L^{14}$, the spring pressing at one end against the base of the recess and at its opposite end against a flange $l^{21}$ formed on the pin and which just fits into said recess (Fig. 16). The pin passes through a hole formed at the base of the recess $l^{20}$ and is threaded into a knob $L^{16}$ which facilitates adjusting the handle to its different positions. Thus, in order to change the setting of the handle, it is necessary only to pull the knob $L^{16}$ against the tension of the spring $l^{19}$ until the pin $l^{17}$ clears the dial plate, adjust the handle to the position desired, and then release the knob so that the pin again enters the hole at the new setting. With this arrangement, the cam $L^{11}$ is held securely in its different adjusted positions.

The handle $L^{14}$ is equipped with a portion $L^{17}$ extending beyond the knob and which is formed with a window $l^{24}$ registering with the inner or centering scale $l^{16}$, and said portion is further equipped with two pointers $l^{22}$ and $l^{23}$, one extending outwardly toward the quadding scale and the other inwardly toward the centering scale in order to facilitate the adjustment of the handle $L^{14}$ by the operator.

Normally the two jaws E and F are held apart in their maximum spaced relation in order to cooperate with a mold of the largest measure, which in most machines is 30 ems. There will be times however, when it is desired to center lines with reference to molds of smaller measures, and in such cases it becomes necessary to bring the jaws closer together before their automatic operation. Then again there will be times when a short line of type, even though cast on a full measure slug, will need to be centered with reference to an imaginary line located to one side of the actual transverse center line of the slug, as for unequal indenting at opposite ends of the line. Since the molds of all sizes have their end walls at the right located in the same position, the required setting of the jaws may be taken care of by adjusting the left hand jaw E only, and this adjustment in the present instance is provided for by mounting the left hand jaw so that it may be set in different positions with reference to its supporting block $E^1$, thus avoiding any disturbance of the mechanism for connecting the jaws with the screw sections.

An arrangement of this character is fully described and illustrated in the patent to Frank C. Frolander, No. 1,949,302, issued February 27th, 1934, and need not be described here in detail, although it has been illustrated more or less diagrammatically in Figs. 11 and 12. Thus, in Fig. 11, the left hand jaw is shown in its normal position for cooperating with a mold of 30 ems. Assuming now that a line of approximately 10 ems is sent into the machine, the distance the respective jaws will move for a quadding left, a centering and a quadding right operation is indicated by the dotted line arrow, the dot and dash line arrows, and the dash line arrow, respectively.

Figure 12:
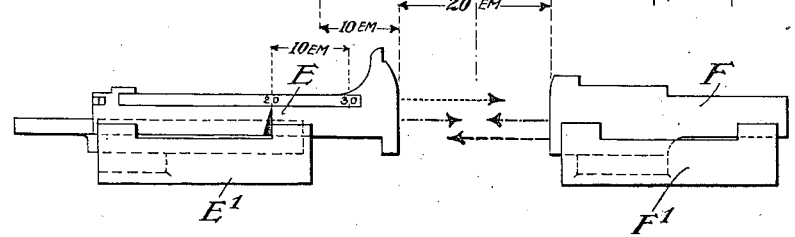
Fig. 12 is a diagrammatic view similar to Fig. 11 and illustrating the movement of the jaws for the same operations, but in this instance with the left hand jaw initially set for a maximum separation of 20 ems between the jaws.

In Fig. 12, there is illustrated a setting of the left hand jaw E which would suffice if the mold selected for use were 20 ems in length or if it were desired to cast the line with reference to an imaginary center line offset from the actual center line of the mold a distance of 5 ems. In both cases, the left hand jaw would be set initially a distance of 10 ems to the right of its normal position and the distance the respective jaws would move for the different quadding or centering operations is indicated in the same manner as in Fig. 11, it being understood that for this or any other setting of the left hand jaw E, the jaw block $E^1$ maintains its normal setting and is actuated by its screw section $H^1$ exactly as before.

On the vise cap $D^1$ there is provided a pointer which cooperates with an em scale on the left hand jaw to facilitate the adjustments previously mentioned, but as all this is fully described in the Frolander application previously mentioned, nothing further will be said here.

Another embodiment of the invention is illustrated in Figs. 20 to 28, and as the construction is similar in many respects, only those details which differ from the embodiment previously described will be mentioned.

For instance, the jaw operating screw member in this embodiment of the invention is made in separate sections N and $N^1$, each of which may be independently rotated or both simultaneously rotated; the screw threads have a substantially larger pitch than in the embodiment previously described, and the jaw supports $E^1$ and $F^1$ supporting the left and right hand jaws E and F, respectively, are permanently connected to the screw sections by pins $n$ and $n^1$ protruding from the lower faces of the jaw supports $E^1$, $F^1$ and projecting to the base of the threads in the screw sections N and $N^1$.

The two screw sections are arranged for independent or simultaneous rotation and for this purpose are mounted on a shaft $N^2$ journalled at its ends in bearings supported in the vise frame (Figs. 20 and 21). The two screw sections are separated by a suitable spacing member $n^2$ and the left hand section N is arranged for rotation about the shaft $N^2$, whereas the right hand section $N^1$ is pinned to the shaft and consequently will rotate therewith. The left hand screw section N is formed at its left end with a gear $N^3$ made integral with the screw section, and immediately adjacent said gear is another gear $N^4$, similar in size, but pinned to the shaft $N^2$. Adjacent these gears is a rotatable driving pinion O adapted to be rotated in both directions in a manner to be hereinafter described and formed with a pair of parallel gear portions $O^1$ and $O^2$ spaced apart the same distance as the gears $N^3$ and $N^4$ and arranged to be slid laterally with respect to said gears, so that either gear alone may be driven by said pinion or both gears driven together.

Thus, when the parts are in the position shown in Fig. 20, which is the normal or neutral position, the gears $O^1$ and $O^2$ on the driving pinion O are out of engagement with the gears $N^3$, $N^4$ associated with the screw sections and, upon operation of the machine for this setting of the parts, the jaws will remain in their positions of maximum separation, or what is the same thing, the machine will be conditioned for normal operation.

When the driving pinion O is actuated to the right (see Fig. 26), wherein the left gear portion $O^2$ meshes with the gear $N^3$ associated with the left hand screw section N, the latter will upon rotation of the driving pinion in a clockwise direction (looking at the machine from the left) be rotated in a counterclockwise direction, causing the left hand jaw to be actuated to the right until it is arrested by contact with a composed line (previously positioned between the jaws) banking against the right hand jaw. This is the condition for quadding left.

For a centering operation, the driving pinion O is shifted from its normal position to the left until both of the gear portions $O^1$, $O^2$ thereon mesh with the gears $N^3$, $N^4$ associated with both screw sections (Fig. 27). Now, when the driving pinion is rotated in a clockwise direction, the screw sections will rotate as a unit in a counterclockwise direction, causing both jaws to be moved equi-distantly toward each other until arrested by contact with a composed line positioned between them.

For a quadding right operation, the driving pinion O is shifted still further to the left (see Fig. 28) until the right hand gear portion $O^1$ thereof meshes with the gear $N^4$ associated with the right hand screw section, and hence when said driving pinion is rotated in a clockwise direction, the right hand screw section will be rotated in a counterclockwise direction, causing the right hand jaw to be actuated to the left until it contacts with the composed line banking against the left hand jaw. Of course, in each of the settings mentioned, the driving pinion will, when rotated in the reverse direction, cause the previously actuated jaw or jaws to be moved away from the composed line to the position of maximum separation, as for instance after the slug casting operation.

It might be here stated that, although the pitch of the screw sections N, $N^1$ is large, in order to secure rapid operation of the parts, it is not so large that there will be any rotation of the screw sections as a result of the end matrices being pressed against the jaws during the justification of the line. In other words, once the jaws have been set by the rotation of the screw sections, they will be locked in position.

In order that the driving pinion O may be shifted to its various positions of adjustment, and also rotated to effect the driving of the screw sections N, $N^1$, it is pinned at the right end of a horizontal shaft $O^3$ splined to a sleeve $O^4$ rotatably mounted in a bearing $d^{10}$ carried by a bracket $D^{10}$ screwed to the vise frame D. The shaft $O^3$ is shifted longitudinally with respect to the sleeve through the medium of a shift lever $O^5$ pivotally mounted near its center on the horizontal arm of an angular bracket $d^{11}$ screwed to the supporting bracket $D^{10}$ and is forked at its rear end to straddle a sleeve $O^6$ encircling the shaft and to which the forked portions of the lever $O^5$ are connected. The sleeve member $O^6$ cooperates with a groove o formed in the shaft so as to permit free rotation of the latter with respect to the sleeve, but which nevertheless will cause the shaft to be shifted to its different positions of adjustment upon the setting of the lever $O^5$. In order that the shaft $O^3$ may be held in its various positions of adjustment, there is provided a spring detent $o^1$ mounted on the bracket $d^{11}$ and which presses into one or another of a series of recesses $o^2$ provided in the sleeve $O^6$ and spaced in proper relation longitudinally along the back. Preferably, there is associated with the lever $O^5$, a plate $O^7$ marked to indicate the various positions of adjustment of the lever for the different operations. Thus as shown in Fig. 21, the plate is marked "Quad R", "Regular", "Central" and "Quad L", indicating of course, the positions of the lever $O^5$ which correspond to the different positions of the driving pinion O for a quadding right operation, a regular machine operation, a centering operation, and a quadding left operation, all as previously described.

The driving pinion O is rotated periodically (in one direction to effect the movement of the jaw or jaws against the line and then in the opposite direction to effect the movement of the jaw or jaws to the maximum position of separation) from the main shaft $M^1$ of the machine through intermediate connections now to be described (Fig. 22). These intermediate connections include a grooved cam $M^{10}$ mounted on the main shaft, a bell crank lever P pivotally mounted on a bracket $M^{11}$ screwed to the base frame of the machine and which is operated by the cam $M^{10}$ through a follower $P^1$, and a reciprocating bar Q connected to the lever P through a link $P^2$ and friction clutch R. The bar Q is formed in its lower portion with two longitudinally spaced slots q and $q^1$ and is slidably mounted at the left end of the rod $D^{11}$ on which the vise frame D is pivoted, said rod being extended for this purpose and formed at its end with a reduced portion $d^{12}$ extending through the upper slot q in the sliding bar, the latter being held on the bar by a circular plate $d^{13}$ screwed to the end thereof (Fig. 20).

The friction clutch R whereby the sliding bar Q is connected to the link $P^2$ for actuation by the bell crank lever P includes a stud $R^1$ passing freely through the lower slot $q^1$ in said bar and threaded into the link member $P^2$, and a friction disc $R^2$ mounted on the stud at the opposite side of the bar and pressed against said bar by a spring $R^3$ encircling the stud and held against the friction disc by a nut $R^4$ threaded on the stud and whereby the tension of the spring and consequently the degree of friction exerted may be regulated.

The bar Q at its upper end (see Figs. 23 and 24) is provided with a cylindrical grooved cam $Q^1$ (having a 45° pitch) and which extends into a sleeve $Q^2$ arranged to rotate in a bearing support $D^{12}$ carried by the bracket $D^{10}$ secured to the vise frame. The sleeve is closed at its upper end where it is formed with a reduced portion $q^2$ on which there is mounted a bevelled gear $q^3$ pinned thereto and meshing with a corresponding bevelled gear $O^8$ pinned to the sleeve $O^4$ which, as previously mentioned, is splined to the shaft $O^3$ carrying the driving pinion O. The sleeve $Q^2$ at its lower end is formed with an enlarged portion $q^4$ through which there is threaded a pin $q^5$ extending beyond the inner face of the sleeve and into the groove formed in the cylindrical cam $Q^1$. Between the enlarged portion $q^4$ of the sleeve and the bearing support $D^{12}$ and also between the bevelled gear $q^3$ and said bearing support, there are provided ball thrust bearings $q^6$ to facilitate rotation of the sleeve member.

In order to complete the description of the parts, it might be here stated that the bell crank lever P, although acting as a unit, actually has its two arms formed as separate parts, both of which are journalled to a shaft $M^{12}$ carried by the supporting bracket (see Fig. 22). Projecting from the hub that carries the forwardly extending arm, there is provided a short vertical arm $P^3$ formed at the top with two spaced laterally extending lugs $p$ and between which the rear arm of the lever extends. Angular movement between the two arms is prevented by a pair of set screws $p^1$ threaded through the lugs $p$ and banking against the opposite edges of the rear lever arm, said screws providing for a degree of angular adjustment between the two arms (see Figs. 20 and 22).

Provision is also made for adjusting the lever P laterally, in the form of the connection between the machine frame and the bracket $M^{11}$, which for this purpose is formed in the shape of a U, with the base of the U resting upon a spacing element $M^{13}$ positioned between it and the machine frame and equipped with two pairs of set screws $m^{10}$ threaded through the opposite legs of the U-shaped portion and banking against the opposite edges of the part of the machine frame to which the bracket is secured.

In the operation of the parts, the bell crank lever P will, as the rise $m^{11}$ in the cam $M^{10}$ arrives adjacent the follower $P^1$ (which incidentally will occur after a composed line has been presented between the line clamping jaws) actuate the lever from its normal position as shown in solid lines in Fig. 22 to the position shown in dotted lines therein, and in so doing, will pull the bar Q downwardly, causing the sleeve member $Q^2$ surrounding the cylindrical cam portion $Q^1$ at the upper end of said bar to be rotated in a counterclockwise direction (looking at the parts from the top) as the pin $q^5$ in the sleeve tracks along in the cam groove, and this rotation will through the parts previously described, effect the rotation of the driving pinion O in a direction to close the jaws upon the line, either by moving the jaws equi-distantly toward each other, or one jaw toward the other, depending on the manner in which the machine is conditioned. When the drop $m^{12}$ in the cam arrives opposite the follower $P^1$ (which occurs after the slug casting operation), the lever P is turned in the opposite direction back to normal position, causing the bar Q to be actuated upwardly, thus to reverse the direction of rotation of the parts and return the jaws (whichever has been actuated) to the original position of maximum separation. Of course, if the machine is set for normal operation, wherein the driving pinion O cooperates with neither of the screw sections N, $N^1$, the reciprocating movement of the bar Q will have no effect as far as moving the jaws E and F is concerned.

Since the composed line positioned between the jaws may vary in length, the actual extent of rotation of the screw sections N, $N^1$ will of course, vary accordingly, and hence, such varied rotation of the sections is provided for by the friction clutch R between the bell crank lever P and the reciprocating bar Q, the clutch after the bar has been arrested merely slipping along in the slot $q^1$ which is of sufficient length to allow the bell crank lever to complete its full movement even though the line presented between the jaws is of full length.

As in the first embodiment, provision is made for moving the jaws outwardly for a limited distance in order to provide for the expansion of the spacebands during justification of the line, and here too the amount of such jaw separation is variable for the same purpose. In the present embodiment (see Fig. 25), this jaw spread is effected through an adjustment in the cam $M^{10}$ on the main shaft. The devices for effecting this adjustment include an adjustable element S tongued and grooved to the cam $M^{10}$ and arranged to be projected into the path of the follower $P^1$ a distance depending upon the amount of line spread desired. The adjustable element S is held in its different positions of adjustment by a screw $s$ passing through a slot $s^1$ in the element and threaded into said cam, the slot $s^1$ being of sufficient length to accommodate the full range of adjustment of the element S. Furthermore, the adjustable element is provided with a scale $s^1$ which cooperates with a pointer $s^3$ on the cam and which serves to indicate the settings corresponding to the degree of line spread desired.

When the adjustable element S arrives opposite the follower $P^1$, during the rotation of the cam, and which will be just prior to the justifying operation, the bell crank lever P is cammed rearwardly and, through the connections previously described, giving the screw sections N, $N^1$ (one or both depending upon the conditioning of the machine), a limited reverse rotation to an extent depending upon the setting of said element, thereby causing the associated jaw or jaws to be backed off the line a corresponding amount. Justification of the line then follows and, after the element S passes the follower $P^1$, the bell crank lever P will be turned back to the position it occupied prior to the jaw spreading operation. Of course, if the line has been justified completely to fill out the space between the jaws, this movement of the bell crank lever will have no effect whatsoever except for a slight slipping of the clutch R in the slot $q^1$. However, in the event that the line has not been justified completely to fill out the space between the jaws, this latter movement of the bell crank lever will act again to close the jaws firmly against the line, thereby permitting the casting operation to proceed.

It might be here stated that the scale on the adjustable element S indicates the line spread that will occur if one jaw only is connected for operation, as in quadding either left or right. In order to obtain an equivalent line spread during a centering operation, the adjustable element would have to be set to indicate one-half of the actual line spread desired for reasons which have been fully set forth in the description of the first embodiment. Of course, if desired two scales could be provided, one for quadding and the other for centering.

At this point, attention might be called to the fact that the instant embodiment has been designed for attachment to existing commercial machines, i. e., the mechanism consists of three units or assemblies, which may be readily added, namely, the prime mover which includes the lever P secured to the main frame of the machine by the bracket $M^{11}$ and the lever actuating cam $M^{10}$, the transmission unit which includes the actuating rod Q and its associated parts, together with the gear shift mechanism, all of which are secured to the vise frame by the bracket D¹⁰ and the vise jaw actuator which includes the screw sections N and N¹ likewise carried by the vise frame through means previously described. Of course, it will be understood that the particular arrangement is not obligatory, since the invention could be permanently built into new machines without substantial change.

In the commercial linotype machine, as is well known, there is provided a so-called pump stop lever which operates to prevent the casting of a slug in the event a line has not been properly justified completely to fill up the space between the line clamping jaws. Ordinarily, the pump stop lever is operated by a limited movement of the right hand jaw brought about by the justification of the line. However, during quadding with the right hand jaw, the latter is moved away from its normal position and consequently some provision must be made for operating the pump stop lever under such conditions. As an additional feature of the present embodiment, the right hand jaw F (see Figs. 27 and 28) is equipped with a vertical plate T extending the full length of the jaw and secured thereto by a pair of pin and slot connections t, the slots being positioned at an angle so that as the plate is pushed from the left, it will have a limited parallel movement in an upward direction. The plate T at its left end and in its normal position, projects slightly beyond the active face of the jaw F. With this arrangement, and regardless of the position of the right hand jaw, the line will upon proper justification, push the plate until the left end thereof is flush with the active face of the jaw and, in so doing, will turn a lever T¹ (one arm of which engages the upper edge of the plate) from the position shown in Fig. 28 to the position shown in Fig. 27, and the lever in thus turning will operate the pump stop lever W and permit the casting operation to proceed, all in a manner well known.

In the accompanying drawings the invention has been shown merely by way of example and in its preferred forms, and obviously, many variations and modifications may be made therein which will still be comprised within its spirit. It is to be understood therefore, that the invention is not limited to any specific form or embodiment, except insofar as such limitations are specified in the appended claims.

This application is a continuation in part of my co-pending application Serial No. 14,023, filed April 1, 1935.

Having thus described my invention, what I claim is:

1. In a slug casting machine, the combination of a pair of line clamping jaws, one movable toward the other for quadding, means including a screw section for effecting such quadding movement of the jaw, and means for thereafter separating said jaws for a limited distance to permit justification.

2. In a slug casting machine, the combination of a pair of line clamping jaws, each movable toward the other for quadding, means including oppositely threaded screw sections for effecting such quadding movement of the jaws, means for thereafter separating said jaws for a limited distance to permit justification, and means for conditioning one or the other of said jaws for operation.

3. In a slug casting machine, the combination of a pair of line clamping jaws, one movable toward the other for quadding, and means including a screw section rotatable in one direction for effecting such quadding movement of the jaw, and thereafter rotatable in the other direction for a limited extent for separating the jaws to permit justification.

4. In a slug casting machine, the combination of a pair of line clamping jaws, each movable toward the other for quadding, means including oppositely threaded screw sections rotatable in one direction for effecting such quadding movement of the jaws and thereafter rotatable in the opposite direction for a limited extent for separating the jaws to permit justification, and means for conditioning one or the other of said jaws for operation.

5. In a slug casting machine, the combination of a pair of line clamping jaws, screw means rotatable in an initial direction to effect relative movement of the jaws toward each other and in the reverse direction to effect relative movement of the jaws away from each other, mechanism for actuating the screw means in the initial direction until arrested by contact of the line clamping jaws with a composed line positioned between them and thereafter in the reverse direction for a limited extent to permit justification of the line, and means for determining the extent of said limited reverse rotation.

6. In a slug casting machine, the combination of a pair of line clamping jaws, screw means rotatable in an initial direction to effect relative movement of the jaws toward each other and in the reverse direction to effect relative movement of the jaws away from each other, mechanism for actuating the screw means in the initial direction until arrested by contact of the line clamping jaws with a composed line positioned between them and thereafter in the reverse direction for a limited extent to permit justification of the line, and manually settable means for determining the extent of said limited reverse rotation.

7. In a slug casting machine, the combination of a pair of line clamping jaws, screw means rotatable in an initial direction to effect relative movement of the jaws toward each other and in the reverse direction to effect relative movement of the jaws away from each other, and mechanism for actuating the screw means in the initial direction until arrested by contact of the line clamping jaws with a composed line positioned between them and thereafter in the reverse direction for a limited extent to permit justification of the line and again in the initial direction subsequent to justification to close the jaws upon the line in the event justification has not been completed.

8. A combination in accordance with claim 5, wherein the screw actuating means is driven from a cam on the main shaft of the machine, and wherein changes in the direction of rotation of the screw means is effected through variations in the contour of said cam.

9. In a slug casting machine, the combination of a pair of line clamping jaws, means including a pair of screw sections, one for each jaw and rotatable in opposite directions during a machine cycle to effect relative movement of the jaws toward and away from each other, and means for conditioning either or both jaws for operation by the respective screw sections as desired.

10. In a slug casting machine, the combination of a pair of line clamping jaws, screw means including oppositely threaded screw sections associated with said jaws and rotatable in an initial direction to effect relative movement of the jaws toward each other and in the reverse direction to effect relative movement of the jaws away from each other, and means for conditioning either of said jaws for operation by the screw means.

11. In a slug casting machine, the combination of a pair of line clamping jaws, screw means including oppositely threaded screw sections associated with said jaw and rotatable in an initial direction to effect relative movement of the jaws toward each other and in the reverse direction to effect relative movement of the jaws away from each other, and means for conditioning either or both of said jaws for operation by the screw means.

12. In a slug casting machine, the combination of a pair of line clamping jaws, one movable toward the other for quadding, means including a screw section rotatable in an initial direction to effect such quadding movement of the jaw and in the reverse direction to effect relative movement of the jaws away from each other, and mechanism for conditioning said jaw for operation by said means or for leaving said jaw unconditioned as desired whereby the machine may operate in the normal way.

13. In a slug casting machine, the combination of a pair of line clamping jaws, screw means including oppositely threaded screw sections associated with said jaws and rotatable in an initial direction to effect such relative movement of the jaws toward each other and in the reverse direction to effect relative movement of the jaws away from each other, and means for conditioning either jaw for operation by the screw means or for leaving both jaws unconditioned as desired whereby the machine may operate in the normal way.

14. In a slug casting machine, the combination of a pair of line clamping jaws, screw means including oppositely threaded screw sections associated with said jaws and rotatable in an initial direction to effect such relative movement of the jaws toward each other and in the reverse direction to effect relative movement of the jaws away from each other, and means for conditioning either or both jaws for operation by the screw means or for leaving both jaws unconditioned as desired whereby the machine may operate in the normal way.

15. In a slug casting machine, the combination of a pair of line clamping jaws, one movable toward the other for quadding or both movable equi-distantly toward each other for centering, a horizontally disposed low pitch screw formed with oppositely threaded sections, one for each jaw, means for selectively coupling and uncoupling said jaws to and from their respective screw sections, said means including a threaded segment carried by each jaw and movable relatively thereto, and a cam shaft having a plurality of cam surfaces and being rotatable selectively to engage either or both said threaded segments with the respective threaded sections of the screw or to disengage both the threaded segments from the screw sections.

16. In a slug casting machine, the combination of a pair of line clamping jaws, screw means including oppositely threaded screw sections associated with said jaws and rotatable in an initial direction to effect relative movement of the jaws toward each other and in the reverse direction to effect relative movement of the jaws away from each other, mechanism for actuating the screw means in the initial direction until arrested by contact of the line clamping jaws with a composed line positioned between them and thereafter in the reverse direction to effect a limited separation of the jaws to permit justification of the line, means for determining the extent of said limited jaw separation, and means for conditioning either of said jaws for operation by the screw means.

17. In a slug casting machine, the combination of a pair of line clamping jaws, screw means associated with said jaws and rotatable in an initial direction to effect relative movement of the jaws toward each other and in the reverse direction to effect relative movement of the jaws away from each other, a driving element for the screw means, means for actuating the driving element to cause the initial rotation of the screw means and then the reverse rotation thereof prior to justification of the line, and means for arresting the driving element after predetermined movement to limit the reverse rotation of the screw means.

18. In a slug casting machine, the combination of a pair of line clamping jaws, screw means associated with said jaws and rotatable in an initial direction to effect relative movement of the jaws toward each other and in the reverse direction to effect relative movement of the jaws away from each other, driving devices for the screw means including a driving shaft, a sleeve threaded on the shaft and movable longitudinally therealong, means for actuating the driving shaft to cause the initial rotation of the screw means and then the reverse rotation thereof prior to justification of the line, means for effecting the movement of the sleeve along the shaft during the reverse rotation of the screw means, and means for arresting the sleeve after predetermined movement, thereby to lock the shaft and limit the reverse rotation of the screw means.

19. A combination in accordance with claim 18, wherein the means for arresting the sleeve are manually adjustable to vary the extent of movement of the sleeve and thereby control the extent of the reverse rotation of the screw means.

20. In a slug casting machine, the combination of a pair of line clamping jaws, screw means associated with said jaws and rotatable in an initial direction to effect relative movement of the jaws toward each other and in the reverse direction to effect relative movement of the jaws away from each other, driving devices for the screw means including a driving shaft, a sleeve threaded on the shaft and movable longitudinally therealong, means for actuating the driving shaft to cause the initial rotation of the screw means and then the reverse rotation thereof prior to justification of the line, means for effecting the movement of the sleeve along the shaft during the reverse rotation of the screw means, a cam for arresting the sleeve after a predetermined movement, thereby to lock the shaft and limit the reverse rotation of the screw means, and means for adjusting the cam to effect variations in the movement of the sleeve.

21. In a slug casting machine, the combination of a pair of line clamping jaws, screw means rotatable in opposite directions to effect relative movement of the jaws toward and away from each other, the movement of the jaws in one direction being arrested by contact with a composed line positioned between them, means operated by a cam on the main cam shaft of the machine to rotate the screw means in opposite directions during each cycle of operation of the machine, said means including positively driven connections, and means for allowing the positively driven connections to complete their full cycle of movement after the jaws have been arrested by contact with the composed line.

22. In a slug casting machine, the combination of a pair of line clamping jaws, screw means rotatable in opposite directions to effect relative movement of the jaws toward and away from each other, the movement of the jaws in one direction being arrested by contact with a composed line positioned between them, means operated by a cam on the main cam shaft of the machine to rotate the screw means in opposite directions during each cycle of operation of the machine, said means including positively driven connections, and a friction clutch for allowing the positively driven connections to complete their full cycle of movement after the jaws have been arrested by contact with the composed line.

23. In a slug casting machine, the combination of a pair of line clamping jaws, each movable toward the other for quadding, oppositely threaded screw sections for effecting such quadding movements of the jaws, and means for rendering one or the other of said screw sections operative when required.

24. In a slug casting machine, the combination of a pair of line clamping jaws movable equidistantly toward each other for centering, oppositely threaded screw sections for effecting such movements of the jaws, and means for rendering both of said screw sections operative or inoperative as required.

25. In a slug casting machine, the combination of a pair of line clamping jaws, each movable toward and from the other, oppositely threaded screw sections, one for each jaw, means for operatively connecting either or both jaws to their respective screw sections as desired, and means for rotating the screw sections in opposite directions during a cycle of operation of the machine.

26. A combination as set forth in claim 24, wherein a single screw is employed having oppositely threaded sections, one for each jaw, and including means for selectively coupling and uncoupling the jaws to and from their respective screw sections.

27. In a slug casting machine, the combination of a pair of line clamping jaws, one movable toward the other for quadding or both movable equidistantly toward each other for centering, a horizontally disposed low pitch screw formed with oppositely threaded sections, one for each jaw, means for selectively coupling and uncoupling said jaws to and from their respective screw sections, said means including a threaded segment carried by each jaw and movable relatively thereto, and a cam shaft having a plurality of cam surfaces and being rotatable selectively to engage and disengage said threaded segments with and from the respective threaded sections of the screw.

28. In a slug casting machine, the combination of a pair of line clamping jaws, one movable toward the other for quadding or both movable equidistantly toward each other for centering, a horizontally disposed low pitch screw formed with oppositely threaded sections, one for each jaw, means for selectively coupling and uncoupling said jaws to and from their respective screw sections, said means including a threaded segment carried by each jaw and movable relatively thereto, a cam shaft having a plurality of cam surfaces and being rotatable selectively to engage and disengage said threaded segments with and from the respective threaded sections of the screw, and means operated by a cam on the main cam shaft of the machine to rotate the screw in opposite directions during each cycle of operation of the machine.

29. In a slug casting machine, the combination of a pair of line clamping jaws, at least one of which is movable toward and from the other jaw, a screw, means for operatively connecting the jaw to or disconnecting it from the screw directly, and means for rotating the screw in opposite directions during a cycle of operation of the machine.

GEORGE P. KINGSBURY.